March 26, 1963 W. BALLÉ 3,082,480
TIRE VULCANISING PRESS MOULD
Filed Oct. 4, 1961 2 Sheets-Sheet 1

INVENTOR:
Walter Ballé

By
Watson, Cole, Grindle & Watson
Attorneys

March 26, 1963 W. BALLE 3,082,480
TIRE VULCANISING PRESS MOULD
Filed Oct. 4, 1961 2 Sheets-Sheet 2

INVENTOR:
Walter Ballé
By
Watson, Cole, Grindle + Watson
Attorneys

United States Patent Office 3,082,480
Patented Mar. 26, 1963

3,082,480
TIRE VULCANISING PRESS MOULD
Walter Ballé, Frankfurt am Main, Germany, assignor to Firma Leonh. Herbert, Maschinenfabrik, Bergen-Enkheim, Germany
Filed Oct. 4, 1961, Ser. No. 142,852
Claims priority, application Germany Oct. 7, 1960
1 Claim. (Cl. 18—42)

The invention relates to a mould which is intended principally for vulcanising re-treaded tires, but which can also be used for vulcanising new tires, preferably those with wire hoops in the bearing surface.

The mould consists of the usual fixed and moveable parts for forming the side walls of the tire, and circumferential segments for forming the tread of the tire. With moulds of this type it is known to arrange the circumferential segments on the fixed part of the mould with the aid of dove-tail guides, so that they are capable of positive movement in a radial direction. The segments move radially through the moveable mould part towards the tire on closing, and away from the tire on opening. The segments have two conical surfaces with which a conical appendage of the moveable part of the mould comes alternately in contact. With such moulds difficulty is experienced in inserting or removing tires.

It is a main object of the present invention to provide a mould which overcomes this disadvantage.

The mould according to the invention is based on the known pressure mould for vulcanising tires, in which the outer surface of the circumferential segments and the inner surface of the moveable part of the mould each form a conical surface, and the fixed part of the mould possesses a guide surface for guiding the radial movement of the circumferential segments.

According to the invention there is provided a pressure mould for vulcanising tires, including a fixed mould part and an axially moveable mould part for forming the side walls of a tire, a plurality of radially-displaceable circumferential mould segments for forming the tread of the tire positioned between and cooperating with said mould parts, said moveable mould portion and segments having co-operating conical surfaces comprised by the inner surface of the moveable mould portion and the outer surfaces of the segments, co-operating guiding surfaces on the segments and the fixed mould part for guiding the radial movement of the segments, guide means coupling the segments to the moveable mould portion and operable when the mould is opened first to move the segments radially outwards and then to lift the segments away from said fixed mould part, said guide means including abutment means which cause said segments to be lifted after their predetermined radial movement.

The mould is designed in such a way that the tire is completely freed and can be easily removed from the mould after the moveable part, together with the peripheral segments, has been raised. After the tire has been removed the fixed part of the mould is unobstructed, so that a new tire may be inserted without difficulty.

In order that the invention may be more clearly understood an embodiment thereof will now be described, by way of example, with reference to the accompanying drawings in which.

Figure 3:
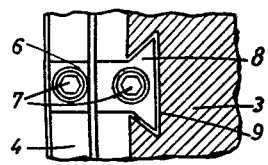
FIGURE 3 is a section on line III—III of FIGURE 1.
Figure 4:
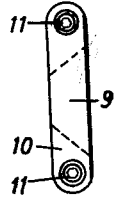
FIGURE 4 is a plan view of a strip for closing the top of a groove as illustrated in FIGURES 1 and 2.
Figure 1:
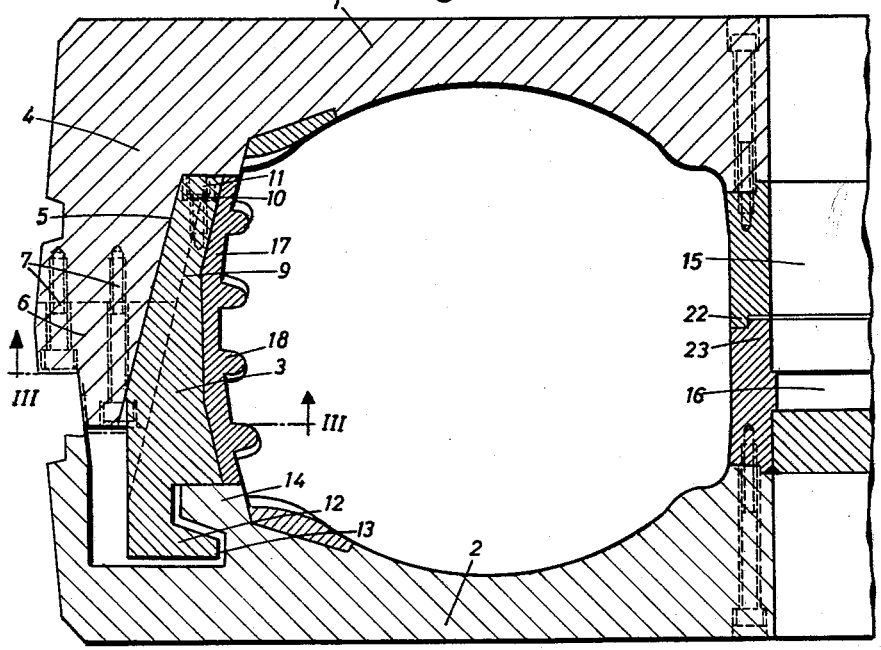
FIGURE 1 is a radial section through the left-hand half of a mould according to the invention showing the mould closed.
Figure 2:
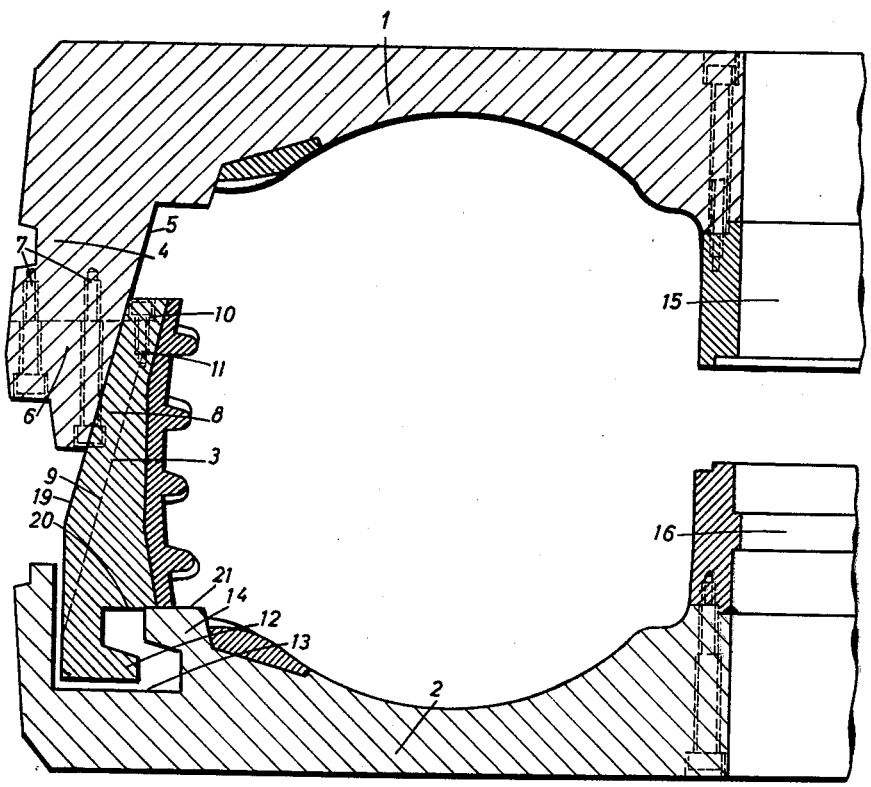
FIGURE 2 is a view similar to FIGURE 1 showing the mould in a partially open position.

Referring to FIGURES 1 and 2, the mould consists of an upper, moveable part 1, a lower, fixed part 2, and a plurality of circumferential segments, one of which is shown in section at 3. To each segment is fastened a profiling plate 17, with profiled ribs 18. Outer surface 19 of segments 3 forms a conical surface. The upper mould part 1 forms an axially directed appendage 4, the inner surface 5 of which is a conical surface. Several guide pieces, one of which is shown at 6, are fastened by screws 7 to the periphery of the lower facial surface of appendage 4. The number of the pieces 6 corresponds to the number of segments 3, and their shape is shown in detail in FIGURE 3. As shown, they terminate in a dove-tail tongue 8 projecting from the conical surface 5. Each circumferential segment 3 possesses a groove 9 of dove-tail section in the conical surface 19, and in which the end 8 of the guide piece 6 engages. As shown in FIGURE 4 each groove 9 is blocked at the end nearest the upper mould part 1 by a machined strip 10 fastened with screws 11 to the segments 3.

Below its lower face 20 each segment 3 has a wedge-shaped projection 12 which projects inwards. When the mould is closed the projection 12 engages in a groove 13 formed in the fixed part of the mould 2. This groove is partially sealed off from the lower part of the mould 2 upwards by a nose 14, which, in the closed position, engages with the projection 12. The top surface 21 of the nose 14 forms a guide surface for the bottom facial surfaces 20 of the segments 3. It lies, parallel to the plane of division of the mould.

A ring 15 and 16 respectively is fastened to the mould parts 1 and 2 in the usual manner, forming the inner seal of the mould, the projections 22 and 23 of the ring effecting the centering of the moveable mould part 2. As may be seen from FIGURE 2, when the mould is closed, and the segments 3 engaged with the fixed mould part 2, surfaces 20 slide inwards over the surface 21 of the nose 14, the ribs 18 penetrating into the rubber of the tire. On displacement upwards of the upper mould part 1 the dove-tail tongues 8 glide in the corresponding grooves 9 of segments 3 thereby occasioning the outward radially directed displacement of the segments 3, the segments 3 being prevented from following the upward movement of the moveable mould part 1 by the abutment of the upper surface of the projection 12 against the lower surface of the nose 14. In the position as represented in FIGURE 2, the dove-tail tongues 8 are in contact with the blocking strip 10: further displacement upwards of the upper part of the mould will accordingly result in lifting the segments 3 away from the lower part 2, the projections 12 and nose 14 no longer being in abutment. On closing of the mould the circumferential segments 3 rest on surface 21, and are moved inwards in a radial direction by the downward movement of the moveable part of the mould, and the ribs 18 are pressed into the yet unprofiled bearing surface of the tire being vulcanised.

I claim:

A pressure mould for vulcanising tires, comprising a fixed mould part and an axially moveable mould part for forming the side walls of a tire, a plurality of radially-displaceable circumferential mould segments for forming the tread of the tire positioned between and co-operating with said mould parts, said moveable mould portion and segments having co-operating conical surfaces comprised by the inner surface of the moveable mould portion and the outer surfaces of the segments, co-operating guiding surfaces on the segments and the fixed mould part for guiding the radial movement of the segments, guide means coupling the segments to the moveable mould portion and operable when the mould is opened first to move the segments radially outwards and then to lift the segments away from said fixed mould part, said guide means including abutment means which cause said segments to be lifted after their predetermined radial movement, the conical outer surface of each segment being formed with a dove-tail groove, said guide means including a plurality of dove-tail tongues extending from the inner conical surface of the moveable mould part and engaging said grooves to couple the segments to the moveable mould part, said abutment means comprising a strip fixed in the upper end of each of said grooves for engagement by said tongues to lift the segments after said predetermined radial movement, interlocking means on the segments and the fixed mould part for limiting the axial movement of the segments during said radial displacement thereof on opening of the mould, and said interlocking means includes a wedge-shaped projection at the bottom of each segment and an overlying nose on the fixed mould part, under which nose said projection engages when the mould is closed.

References Cited in the file of this patent
UNITED STATES PATENTS

| | | |
|---|---|---|
| 1,475,032 | Shrum et al. | Nov. 20, 1923 |
| 1,604,452 | Krusemark | Oct. 26, 1926 |
| 1,830,676 | Remark | Nov. 3, 1931 |
| 2,358,857 | Gits | Sept. 26, 1944 |
| 2,567,985 | Baker et al. | Sept. 18, 1951 |